(12) United States Patent
Ueda (10) Patent No.: US 7,961,629 B2
(45) Date of Patent: Jun. 14, 2011

(54) TEST APPARATUS, TEST METHOD, WAVEFORM GENERATOR AND WAVEFORM GENERATING METHOD

(75) Inventor: Motoo Ueda, Santa Clara, CA (US)

(73) Assignee: Advantest Corporation, Tokyo (JP)

( * ) Notice: Subject to any disclaimer, the term of this patent is extended or adjusted under 35 U.S.C. 154(b) by 454 days.

(21) Appl. No.: 11/741,771

(22) Filed: Apr. 30, 2007

(65) Prior Publication Data

US 2008/0239966 A1 Oct. 2, 2008

Related U.S. Application Data

(63) Continuation-in-part of application No. PCT/JP2007/056479, filed on Mar. 27, 2007, which is a continuation of application No. 11/393,383, filed on Mar. 30, 2006.

(51) Int. Cl.
*H04L 12/26* (2006.01)

(52) U.S. Cl. .......................... 370/241; 370/254; 370/295

(58) Field of Classification Search .................. 370/241; 375/295, 222; 379/254
See application file for complete search history.

(56) References Cited

U.S. PATENT DOCUMENTS

| | | | |
|---|---|---|---|
| 3,952,189 A | 4/1976 | Fabricius | |
| 4,161,633 A * | 7/1979 | Treiber | 379/254 |
| 6,369,735 B1 | 4/2002 | Yang | |
| 6,724,730 B1 * | 4/2004 | Mlinarsky et al. | 370/241 |
| 7,292,626 B1 * | 11/2007 | Gal | 375/222 |
| 7,698,121 B2 * | 4/2010 | Steenkiste et al. | 703/23 |
| 2004/0005015 A1 * | 1/2004 | Chan | 375/295 |
| 2005/0174926 A1 | 8/2005 | Barrass | |

FOREIGN PATENT DOCUMENTS

| | | |
|---|---|---|
| JP | 02-111126 | 4/1990 |
| JP | 10-307168 | 11/1998 |
| JP | 11-317710 | 11/1999 |
| WO | 98/10590 | 3/1998 |

* cited by examiner

*Primary Examiner* — Jason E Mattis
*Assistant Examiner* — Joey Bednash
(74) *Attorney, Agent, or Firm* — Osha • Liang LLP (57) ABSTRACT

A test apparatus, which is for testing a device under test including a receiving circuit for receiving signals transmitted through a communication cable, includes: a waveform generating section for outputting waveform data to define a waveform to be provided to an input terminal of a receiving circuit; a digital filter having the filter characteristic substantially reverse to the attenuation characteristic of the communication cable, for outputting amplified waveform data obtained by amplifying the waveform data; a DA converter for converting the amplified waveform data to an analog waveform; and a low-pass filter having the attenuation characteristic substantially same as that of the communication cable, for attenuating the analog waveform and providing the same to the receiving circuit.

13 Claims, 7 Drawing Sheets

Prior Art

TEST APPARATUS, TEST METHOD, WAVEFORM GENERATOR AND WAVEFORM GENERATING METHOD

CROSS REFERENCE TO RELATED APPLICATION

This is a continuation in-part application of PCT/JP2007/056479 filed on Mar. 27, 2007 which claims priority from a U.S. Non-provisional patent application Ser. No. 11/393,383, filed on Mar. 30, 2006 the contents of which are incorporated herein by reference.

BACKGROUND

1. Technical Field

The present invention relates to a test apparatus and a test method. Particularly, the present invention relates to a test apparatus and a test method for testing a device under test including a receiving circuit for receiving signals transmitted through a communication cable.

2. Related Art

Figure 1:
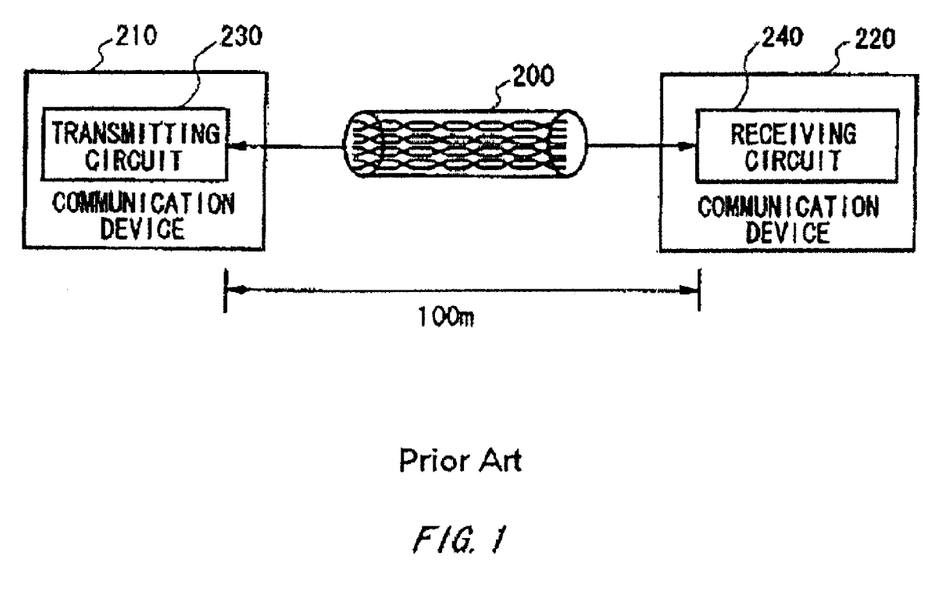
FIG. 1 shows communication devices 210 and 220, and a communication cable 200 corresponding to 10Gbase-T.

FIG. 1 shows communication devices 210 and 220, and a communication cable 200 corresponding to 10Gbase-T. Recently, it has been made advance to standardize 10Gbase-T (IEEE802.3an) being capable of speedily transmitting at 10 Gbps as a next-generation Ethernet (registered trademark) standard. A communication network system corresponding to the 10Gbase-T can communicate by connecting a four-line twisted-pair communication cable 200 with the maximum length of 100 m between a transmitting circuit 230 and a receiving circuit 240. In addition, there are the following prior art documents related to a signal generation, which are U.S. Patent Application Publication No. 2005/0174926 and U.S. Pat. Nos. 3,952,189 and 6,369,735.

Figure 2:
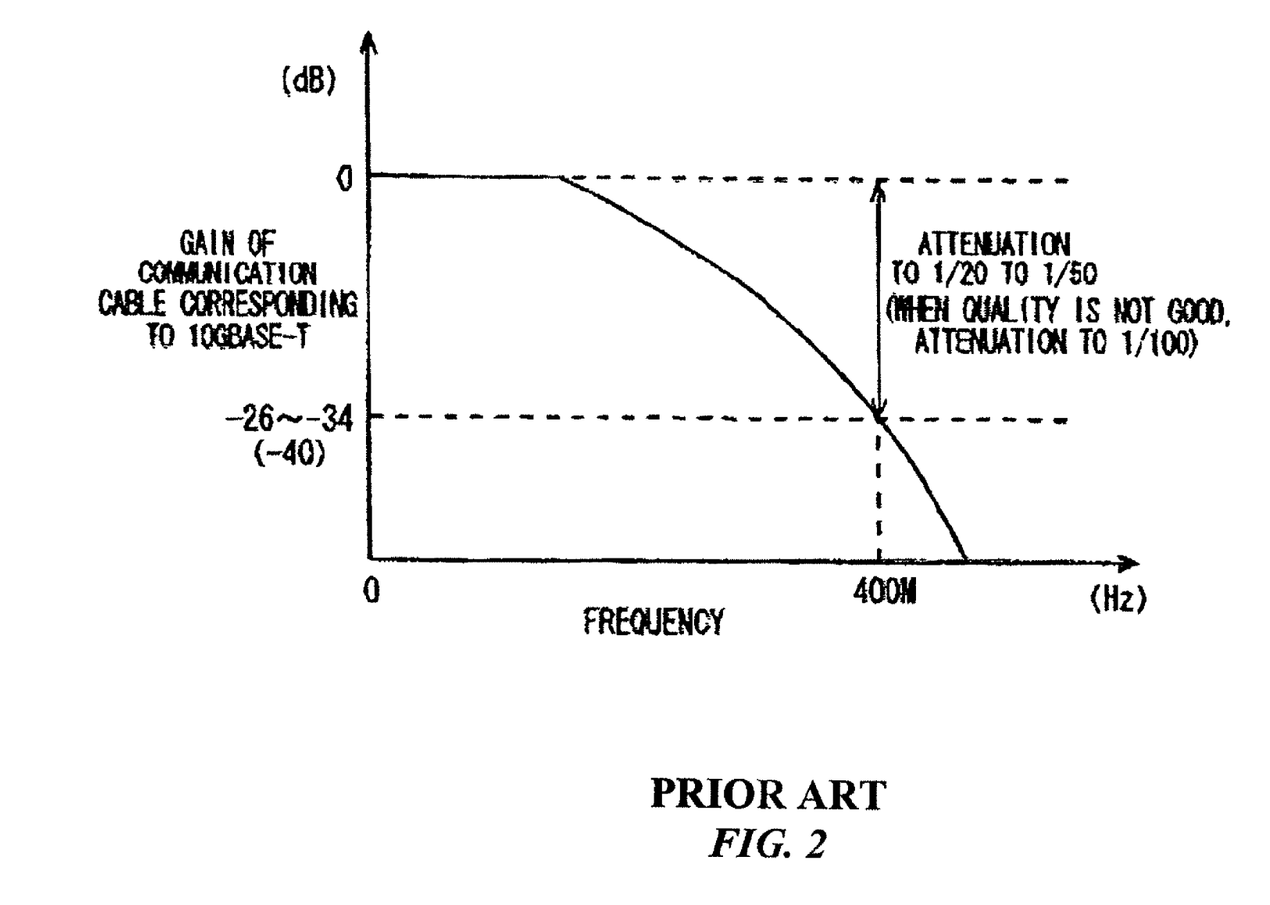
FIG. 2 is a view exemplary showing a frequency characteristic of gain of the communication cable 200 corresponding to 10Gbase-T.

FIG. 2 is a view exemplary showing a frequency characteristic of gain of the communication cable 200 corresponding to 10Gbase-T. Here, testing a communication device, a test apparatus generates a signal waveform to be received by the receiving circuit through the communication cable using a DA converter and outputs the generated signal waveform as a test signal. For example, as for the signal passed through a 100 m length of the communication cable 200 corresponding to the 10Gbase-T, as shown in FIG. 2, the frequency component in 400 MHz frequency band is attenuated to around $1/20$-$1/50$, and if the quality of cable is not good, the frequency component is further attenuated to about $1/100$. As thus described above, the test apparatus generates a test signal of which high-frequency component is significantly attenuated when the test apparatus tests the communication device 220 corresponding to the Gbase-T.

In this case, the test apparatus should have had accuracy more than the predetermined bit number in the entire frequency band and have included a DA converter with a high-bit resolution than the bit number for the accuracy necessary to indicate the signal waveform when the test apparatus outputs the test signal of which high-frequency component is significantly attenuated. For example, if the test apparatus outputs a signal waveform of which low-frequency component is not attenuated and of which high-frequency component is attenuated to $1/100$ at six-bit accuracy in the entire frequency band, the test apparatus should have a DA converter having 12~13-bit resolution obtained by adding the bit number (6 bits) for the accuracy necessary to indicate the waveform and the bit number (6 to 7 bits) for the attenuation to $1/100$. However, such DA converter with the high resolution is very expensive and large in size.

Thus, an object of the present invention is to provide a test apparatus and a test method being capable of solving the problem accompanying the conventional art. This object is achieved by combining the features recited in independent claims. Then, dependent claims define further effective specific example of the present invention.

SUMMARY

To solve the above problem, according to the first aspect of the present invention, there is provided a test apparatus for testing a device under test including a receiving circuit for receiving signals transmitted through a communication cable. The test apparatus includes: a waveform generating section for outputting waveform data to define a waveform to be provided to an input terminal of the receiving circuit; a digital filter having a filter characteristic substantially reverse to an attenuation characteristic of the communication cable, for outputting amplified waveform data obtained by amplifying the waveform data; a DA converter for converting the amplified waveform data to an analog waveform; and a low-pass filter having an attenuation characteristic substantially same as that of the communication cable, for attenuating the analog waveform and providing the same to the receiving circuit.

A minimum voltage step of converting by the DA converter may be larger than a maximum voltage of the analog waveform provided from the low-pass filter to the receiving circuit. The communication cable may include a plurality of transmitting paths. The receiving circuit may include the plurality of input terminals for respectively receiving a signal from each of the plurality of transmitting paths. The waveform generating section may output the plurality of waveform data which should be provided to the plurality of input terminals and which include interference between the plurality of transmitting paths. The test apparatus further includes a simulation section for calculating by simulation a receiving waveform inputted to the input terminal of the receiving circuit after an output signal of a transmitting circuit for transmitting a signal to the receiving circuit through the communication cable has passed through the communication cable, in which the waveform generating section may acquire digital data of the receiving waveform and output the same as the waveform data.

According to the second aspect of the present invention, there is provided a test method for testing a device under test including a receiving circuit for receiving signals transmitted through a communication cable. The test method includes: outputting waveform data to define an waveform to be provided to an input terminal of the receiving circuit; outputting amplified waveform data obtained by amplifying the waveform data, the outputting having a filter characteristic substantially reverse to the attenuation characteristic of the communication cable; converting the amplified waveform data to an analog waveform; and attenuating the analog waveform and providing the same to the receiving circuit, the attenuating having an attenuation characteristic substantially same as that of the communication cable.

The test method may further include calculating by simulation a receiving waveform inputted to the input terminal of the receiving circuit after an output signal of a transmitting circuit for transmitting a signal to the receiving circuit through the communication cable has passed through the communication cable, and the outputting waveform data may include acquire digital data of the receiving waveform to output the same as the waveform data.

According to the third aspect of the present invention, there is provided a test apparatus including: a waveform generating section for outputting waveform data to define a waveform to be provided to an input terminal of a device under test; a digital filter being connected to an output terminal of the waveform generating section, for outputting amplified waveform data obtained by amplifying the waveform data based on a predetermined filter characteristic; a DA converter being connected to an output terminal of the digital filter, for converting the amplified waveform data to an analog waveform; and an analog filter being connected to an output terminal of the DA converter and having a filter characteristic substantially reverse to that of the digital filter, for attenuating the analog waveform to supply it to the input terminal of the device under test.

A minimum voltage step of converting by the DA converter may be larger than a maximum voltage of the analog waveform provided from the analog filter to the device under test.

The filter characteristic of the digital filter may be a transfer characteristic substantially reverse to that of an interchange circuit element that transfers an output signal of a transmitting circuit for transmitting a signal to the device under test to the device under test.

The test apparatus may further include a simulation section for calculating by simulation a receiving waveform inputted to the input terminal of the device under test after an output signal of a transmitting circuit for transmitting a signal to the device under test through the communication cable has passed through the interchange circuit element, and the waveform generating section may acquire digital data of the receiving waveform and output the same as the waveform data.

According to the fourth aspect of the present invention, there is provided a test method including: outputting waveform data to define a waveform to be provided to an input terminal of a device under test; outputting amplified waveform data obtained by amplifying the waveform data based on a predetermined filter characteristic; converting the amplified waveform data to an analog waveform; and attenuating the analog waveform and providing the same to the input terminal of the device under test, the attenuating having a filter characteristic substantially reverse to that of the outputting amplified waveform data.

According to the fifth aspect of the present invention, there is provided a waveform generator including: a waveform generating section for outputting waveform data; a digital filter being connected to an output terminal of the waveform generating section, for outputting amplified waveform data obtained by amplifying the waveform data based on a predetermined filter characteristic; a DA converter being connected to an output terminal of the digital filter, for converting the amplified waveform data to an analog waveform; and an analog filter being connected to an output terminal of the DA converter and having a filter characteristic substantially reverse to that of the digital filter, for attenuating the analog waveform to output it.

According to the sixth aspect of the present invention, there is provided a waveform generating method including: outputting waveform data; outputting amplified waveform data obtained by amplifying the waveform data based on a predetermined filter characteristic; converting the amplified waveform data to an analog waveform; and attenuating the analog waveform and outputting it, the attenuating having a filter characteristic substantially reverse to that of the outputting amplified waveform data.

Here, all necessary features of the present invention are not listed in the summary of the invention. The sub-combinations of the features may become the invention.

DESCRIPTION OF EXEMPLARY EMBODIMENTS

Hereinafter, the present invention will now be described through preferred embodiments. The embodiments do not limit the invention according to claims and all combinations of the features described in the embodiments are not necessarily essential to means for solving the problems of the invention.

Figure 3:
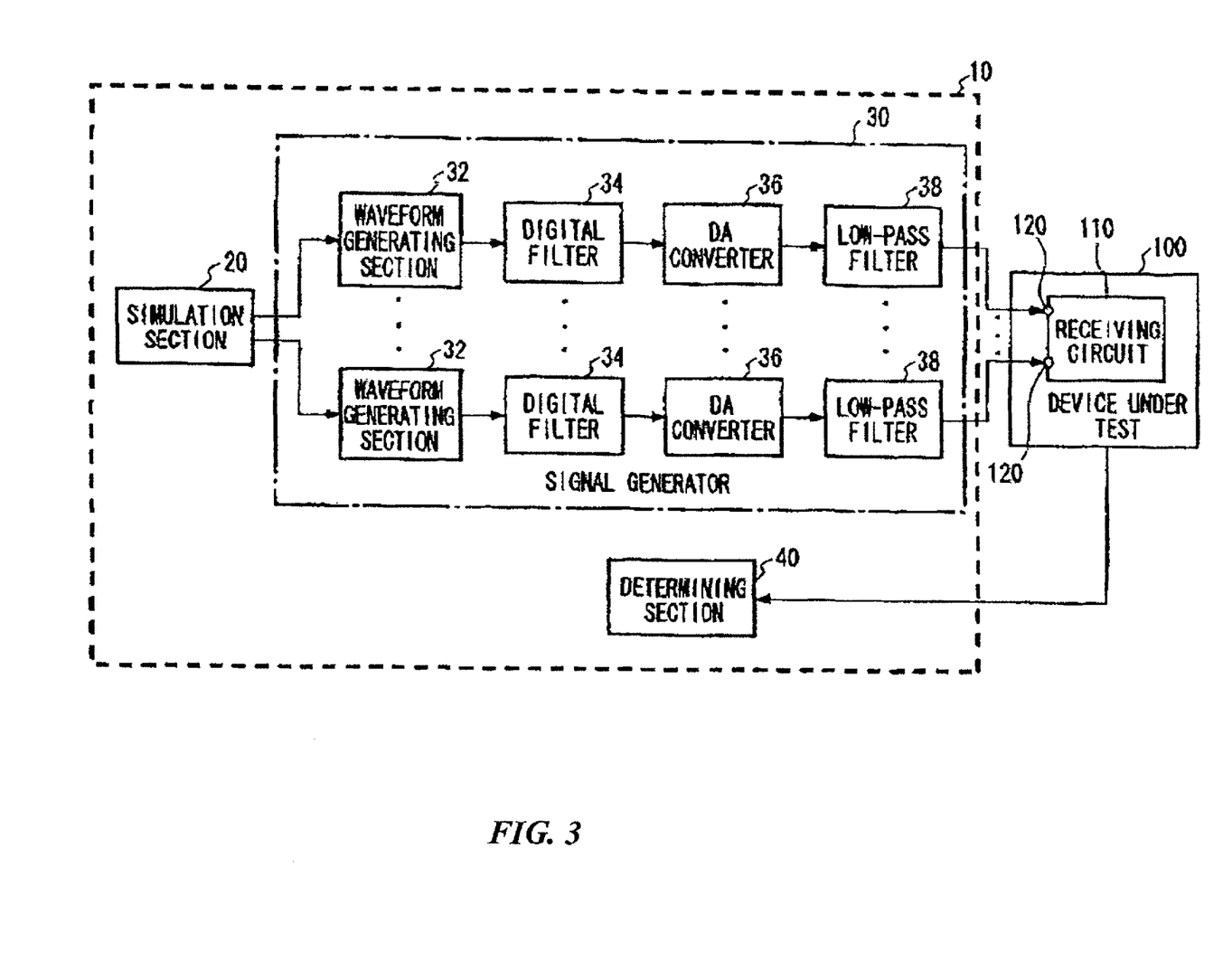
FIG. 3 shows a configuration of a test apparatus 10 along with a device under test 100 according to the present embodiment.

FIG. 3 shows a configuration of a test apparatus 10 along with a device under test 100 according to the present embodiment. The device under test 100 includes a receiving circuit 110 for receiving signals transmitted through a communication cable. Specifically, the receiving circuit 110 receives a signal of which high-frequency component is attenuated as the result of passing through the signal transmitted from a transmitting circuit. For example, the receiving circuit 110 may receive the signal of which frequency component in 400 MHz frequency band is attenuated to $\frac{1}{100}$ after the signal corresponding to 10Gbase-T which is transmitted from the transmitting circuit is passed through a 100 m length of the communication cable 200. Hereinafter, the waveform of the signal of which frequency component in 400 MHz frequency band is attenuated to $\frac{1}{100}$ after the transmitting signal corresponding to the 10Gbase-T is passed through a 100 m length of the communication cable 200 is referred to as "10Gbase-T receiving signal". When the communication cable includes a plurality of transmitting paths, the receiving circuit 110 may have a plurality of input terminals 120 for receiving the signal from each of the plurality of transmitting paths, respectively.

The test apparatus 10 tests the device under test 100 including the receiving circuit 110. Specifically, the test apparatus 10 provides a test signal indicative of a receiving waveform to be received by the receiving circuit 110 through the communication cable to the receiving circuit 110 and receives an output signal outputted by the device under test 100 according to the test signal to determine pass/fail of the device under test 100. The test apparatus 10 may output the test signal indicative of the 10Gbase-T receiving signal to the device under test 100 to determine pass/fail of the device under test 100.

The test apparatus 10 includes a simulation section 20, a signal generator 30 and a determining section 40. The simulation section 20 calculates by simulating a receiving waveform inputted to the input terminal 120 of the receiving circuit 110 after the output signal of the transmitting circuit for transmitting the signal to the receiving circuit 110 through the communication cable is passed through the communication cable. That is to say, the simulation section 20 calculates by simulating the receiving waveform of the signal which is outputted from the transmitting circuit and inputted to the receiving circuit 110 through the communication cable and of which high-frequency component is attenuated depending on the frequency characteristic of the communication cable. The simulation section 20 may calculate the waveform of the Gbase-T receiving signal as the receiving waveform, for example. Then, the simulation section 20 outputs waveform data indicative of the calculated receiving waveform to the signal generator 30.

Further, the simulation section 20 may calculate the receiving waveform including various interfering signals (e.g. echo) due to passing through the communication cable in addition to the attenuation of the high-frequency component due to the communication cable. Additionally, when the communication cable has a plurality of transmitting paths, the simulation section 20 may calculate the receiving waveform including the effect of interference generated in the plurality of transmitting paths corresponding to each of the plurality of transmitting paths. Here, the simulation section 20 may be individually provided outside of the test apparatus 10.

The signal generator 30 generates one or more test signals corresponding to each of the input terminals 120 of the receiving circuit 110. The signal generator 30 includes a waveform generating section 32, a digital filter 34, a DA converter 36 and a low-pass filter 38. The signal generator 30 may include plurality of waveform generating sections 32, digital filters 34, DA converters 36 and low-pass filters 38 which are corresponded to the input terminals 120, respectively.

Figure 4:
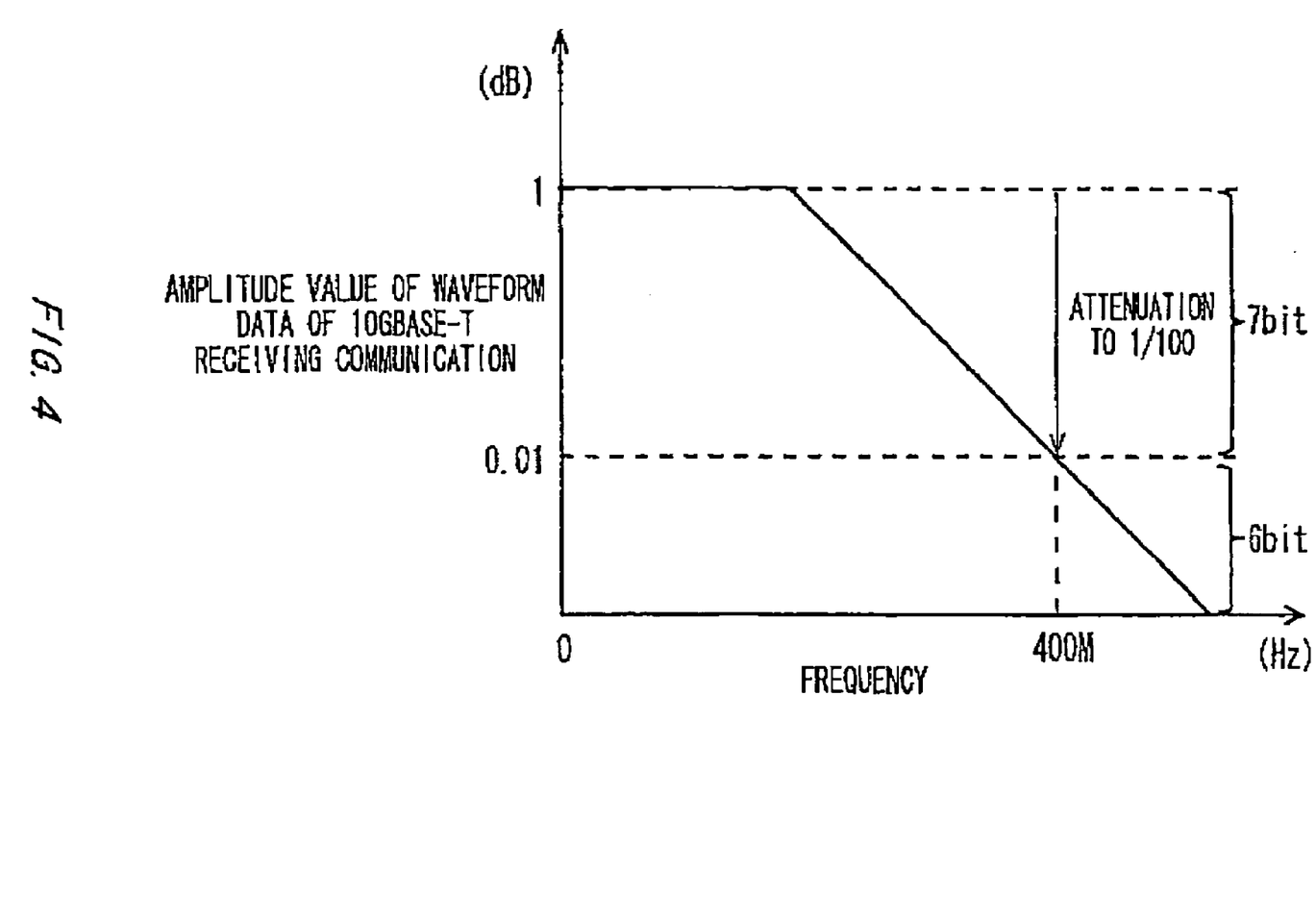
FIG. 4 is a view exemplary showing an amplitude value to frequency, of waveform data of a 10Gbase-T receiving signal.

FIG. 4 is a view exemplary showing an amplitude value to frequency, of waveform data of the 10Gbase-T receiving signal. Each of the waveform generating sections 32 outputs waveform data to define the waveform to be provided to the corresponding input terminal 120 of the receiving circuit 110. That is to say, each of the waveform generating sections 32 outputs the waveform data of the signal which is outputted from the transmitting circuit and inputted to the receiving circuit 110 through the communication cable and of which high-frequency component is attenuated depending on the frequency characteristic of the communication cable. Each of the waveform generating sections 32 may output the waveform data of the 10Gbase-T receiving signal of which amplitude value in 400 MHz frequency band is attenuated to $\frac{1}{100}$ as shown in FIG. 4, for example. Additionally, each of the waveform generating sections 32 may output waveform data including various interfering signals (e.g. echo) generated due to passing through the communication cable in addition to the attenuation of the high-frequency component due to the communication cable. Further, each of the waveform generating sections 32 may output waveform data which should be provided to the plurality of input terminals 120 and which include the effect of interference generated in the plurality of transmitting paths, when the communication cable has the plurality of transmitting paths. Further, each of the waveform generating sections 32 may acquire digital data of the receiving waveform from the simulation section 20 and output the same as the waveform data.

Further, the waveform generating section 32 outputs waveform data having a predetermined bit accuracy in the entire frequency band. That is to say, the waveform generating section 32 outputs waveform data having a predetermined bit accuracy both in the low-frequency band in which the frequency component is less attenuated and in the high-frequency band in which the frequency component is more attenuated. For example, when the waveform data of the 10Gbase-T receiving signal is outputted at six-bit accuracy in the entire frequency band, the waveform generating section 32 outputs 12~13-bit waveform data obtained by adding the bit number (6 bits) for the accuracy necessary to indicate the signal waveform and the bit number (6 to 7 bits) for the attenuation to $\frac{1}{100}$.

Figure 5:
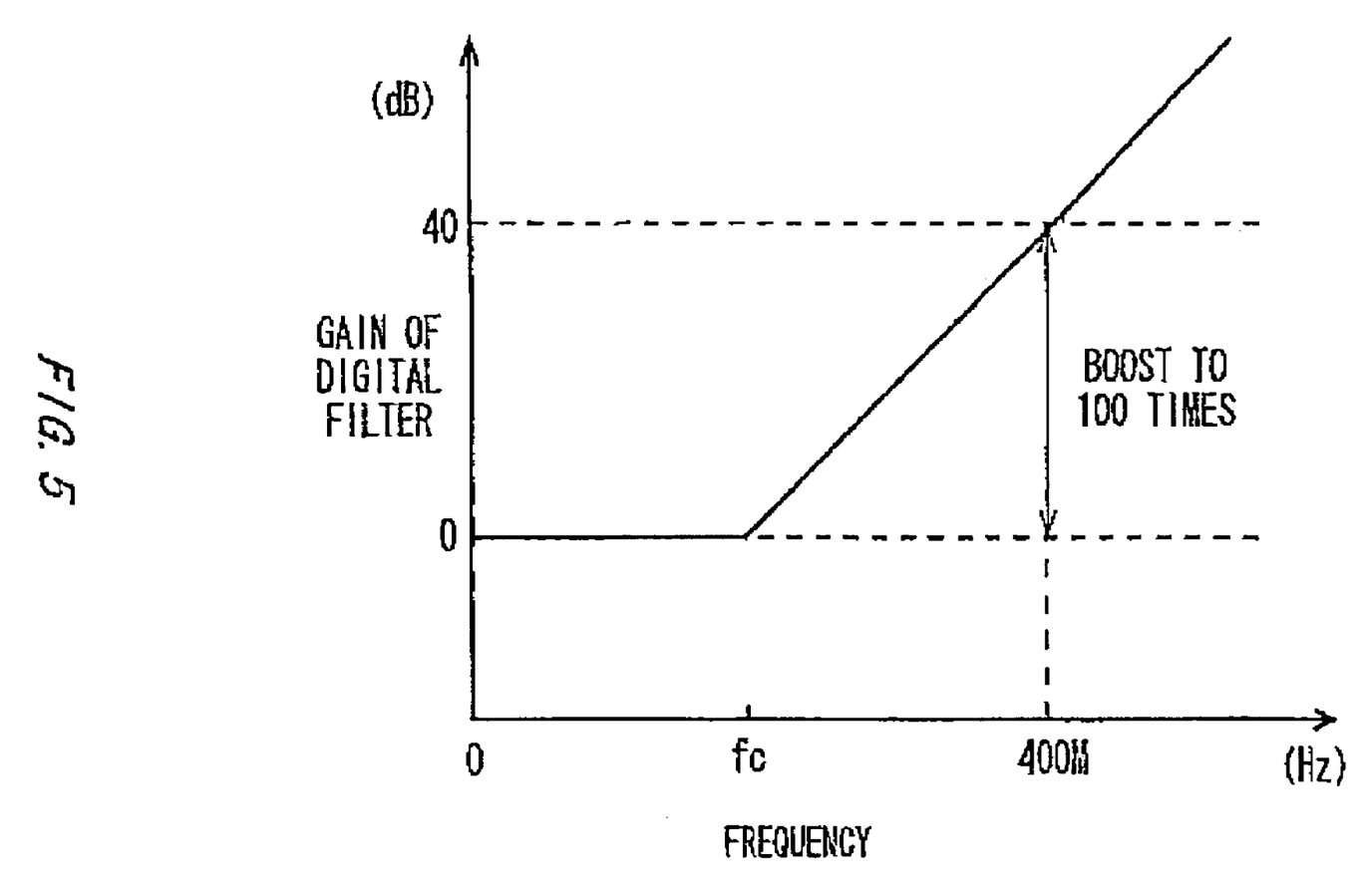
FIG. 5 is a view exemplary showing a frequency characteristic of gain of a digital filter 34.
Figure 6:
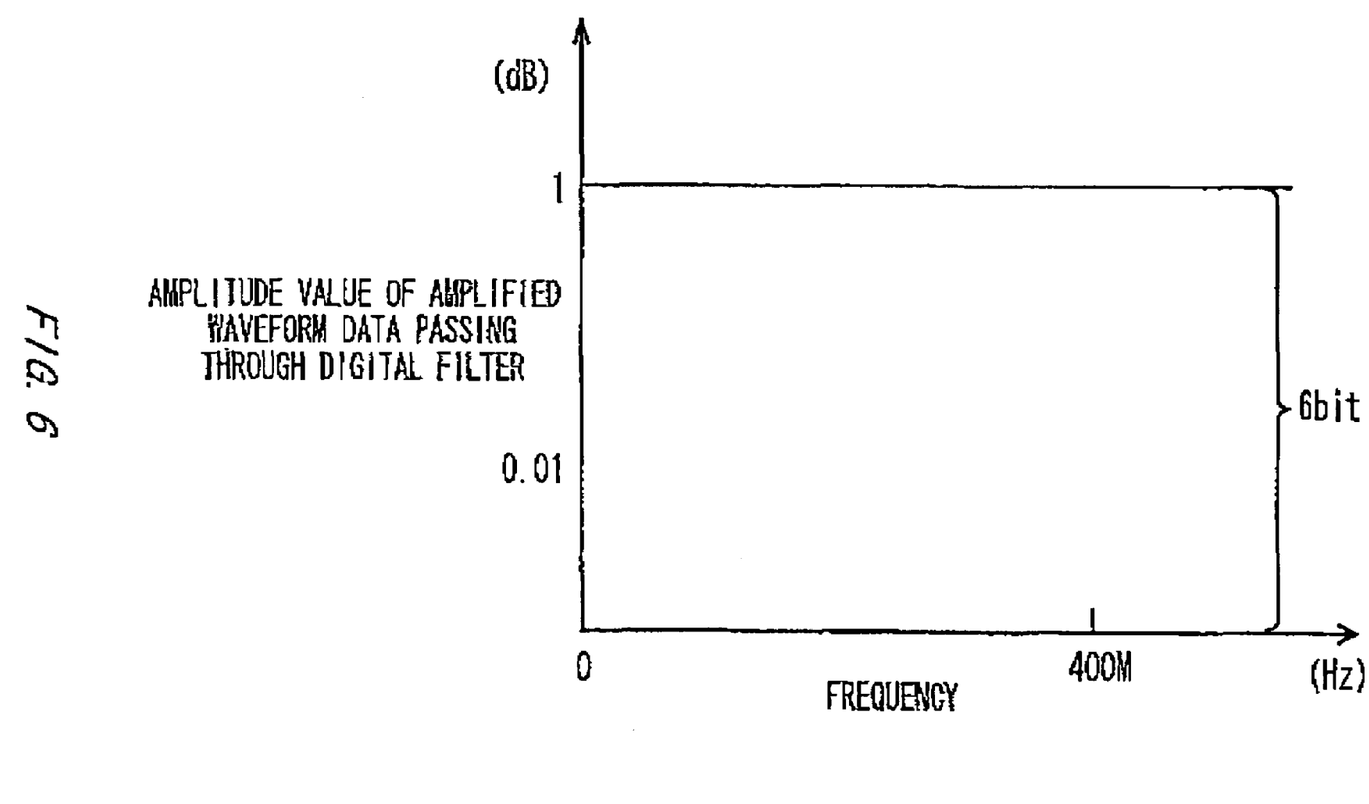
FIG. 6 is a view exemplary showing an amplitude value to frequency, of amplified waveform data passing through the digital filter 34.

FIG. 5 is a view exemplary showing a frequency characteristic of gain of the digital filter 34. FIG. 6 is a view exemplary showing an amplitude value to frequency, of amplified waveform data passing through the digital filter 34.

Each of the digital filters 34 has the high-pass characteristic substantially reverse to the frequency characteristic of the low-pass filter 38 after-described in detail. In the present embodiment, each of the digital filters 34 has the filter characteristic substantially reverse to the attenuation characteristic of the communication cable and outputs amplified waveform data obtained by amplifying the waveform data outputted from the corresponding waveform generating section 32. As an example, each of the digital filters 34 may have a filter characteristic by which each digital filter 34 outputs amplified waveform data obtained by boosting waveform data 100 times in 400 MHz frequency band as shown in FIG. 5.

In this way, each of the digital filters 34 can offset the frequency characteristic of the communication cable by boosting the high-frequency component of the waveform data generated by the waveform generating section 32 and output the amplified waveform data having substantially flat frequency characteristic. Therefore, the digital filter 34 can output amplified waveform data in which the least number of bits required for indicating a waveform is smaller than the number of bits of the waveform data outputted from the waveform generating section 32. For example, the digital filter 34 can output the amplified waveform data obtained by compressing the bit number (6 to 7 bits) according to the attenuation to $\frac{1}{100}$ by filtering as shown in FIG. 5. Therefore, the digital filter 34 can convert the waveform data of the 10Gbase-T receiving signal that have six-bit accuracy in the entire frequency band and a relatively large 12~13-bit dynamic range to the amplified waveform data that have relatively small six-bit dynamic range as shown in FIG. 6. Here, each of the digital filter 34 may have the filter characteristic substantially reverse to the attenuation characteristic of the communication cable in the frequency band targeted for testing or the frequency band used by the receiving circuit 110.

Each of the DA converters 36 converts the amplified waveform data outputted from the corresponding digital filter 34 to an analog waveform. Therefore, the DA converter 36 outputs the analog waveform of which frequency characteristic does not involve the attenuation depending on the frequency characteristic of the communication cable but is substantially flat. Here, the dynamic range of the signal inputted to the DA converter 36 is reduced by the digital filter 34. Accordingly, the DA converter 36 may have at least the bit number for the accuracy necessary to indicate the signal waveform of the waveform data outputted from the waveform generating section 32 as a resolution. For example, even if 12~13-bit waveform data is outputted from the waveform generating section 32 in order to output the 10Gbase-T receiving signal at six-bit accuracy in the entire frequency band, the DA converter 36 may have six-bit resolution. Additionally, for example, the minimum voltage step of converting by each of the DA converters 36 may be larger than the maximum voltage of the analog waveform provided from the low-pass filter 38 to the input terminal 120.

Figure 7:
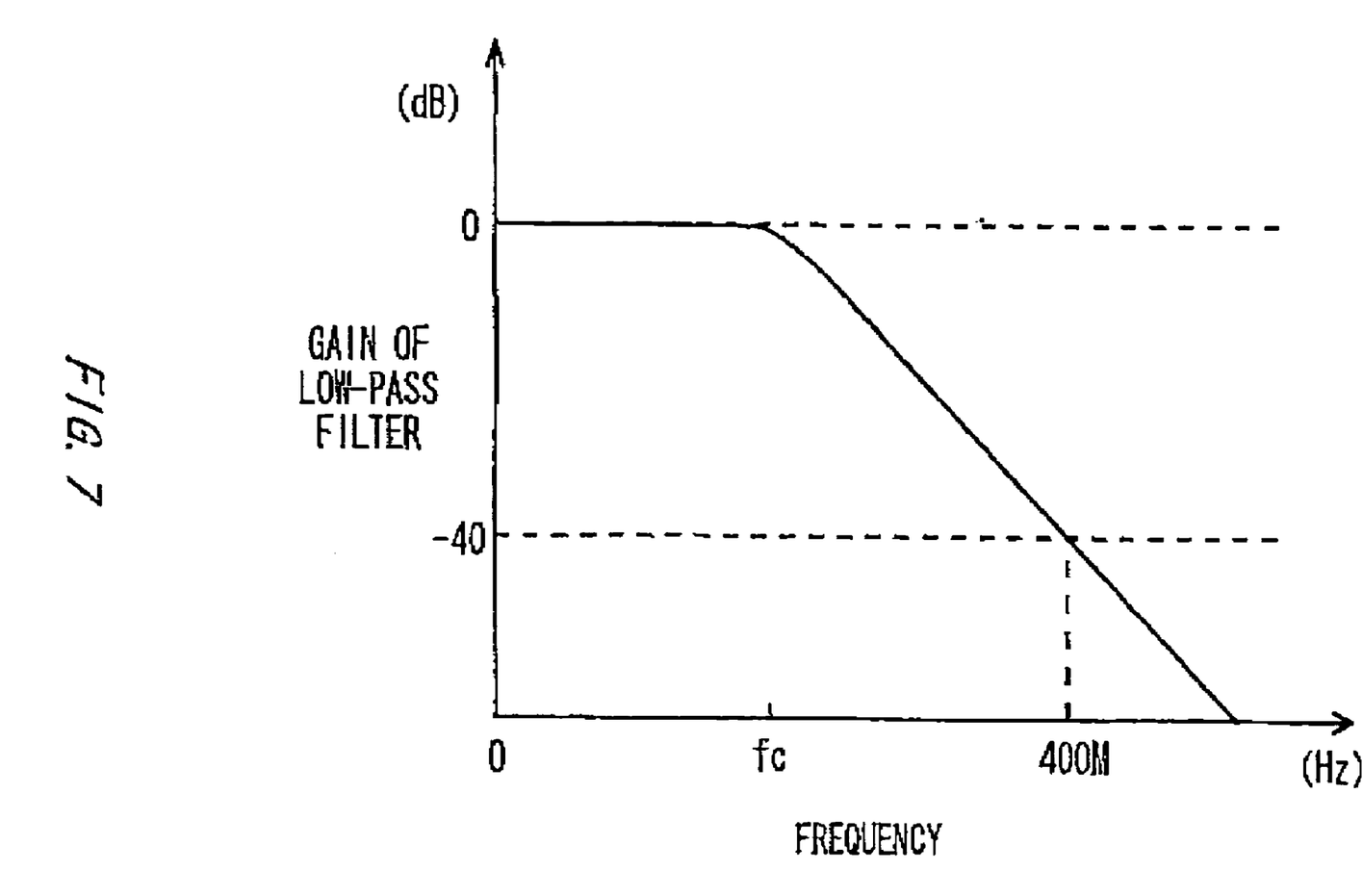
FIG. 7 is a view exemplary showing a frequency characteristic of gain of a low-pass filter 38.

FIG. 7 is a view exemplary showing a frequency characteristic of gain of the low-pass filter 38. Each of the low-pass filters 38 has the attenuation characteristic substantially the same as that of the communication cable and attenuates the analog waveform outputted from the corresponding DA converter 36. For example, each of the low-pass filters 38 may have a filter characteristic by which a signal obtained by attenuating a component in 400 MHz frequency band to 1/100 is outputted as shown in FIG. 7.

Thereby each of the low-pass filters 38 can return the converted waveform having the frequency characteristic which does not involve the attenuation depending on the frequency characteristic of the communication cable but is substantially flat to the original waveform generated from the waveform generating section 32. As an example, each of the low-pass filters 38 outputs a waveform signal obtained by attenuating a component of the signal having the flat frequency characteristic as shown in FIG. 6 to 1/100 in 400 MHz frequency band as shown in FIG. 2. That is to say, the low-pass filter 38 outputs the analog waveform being attenuated depending on the frequency characteristic of the communication cable. Then, each of the low-pass filter 38 provides the analog signal waveform to the corresponding input terminal 120 of the receiving circuit 110 as a test signal. Here, each of the low-pass filters 38 may have the filter characteristic substantially the same as the attenuation characteristic of the communication cable in the frequency band targeted for testing or the frequency band used by the receiving circuit 110.

Then, the determining section 40 receives the output signal outputted by the device under test 100 in response to inputting a test signal by the receiving circuit 110 and determines pass/fail of the received output signal.

As described above, the signal generator 30 can output a test signal indicative of a receiving waveform of which high-frequency component inputted to the receiving circuit 110 through the communication cable is attenuated and having a large dynamic range by using the DA converter 36 having a low resolution. That is to say, the signal generator 30 can employ the DA converter 36 having a resolution with the bit number less than the accuracy of the test signal to be outputted. Therefore, the signal generator 30 can employ the high-speed DA converter 36 and generate a high-speed test signal.

Here, it is not necessarily that the digital filter 34 should have the filter characteristic reverse to that of the communication cable provided that the digital filter 34 has the filter characteristic being capable of at least reducing the dynamic range of the waveform data outputted from the waveform generating section 32. In this case, the low-pass filter 38 also has the characteristic reverse to that of the digital filter 34. Additionally, for another example, the test apparatus 10 may include the digital filter 34 in front of the waveform generating section 32. In this case, the digital filter 34 may previously perform filtering by an operation executed by the program before the waveform generating section 32 generates waveform. In this way, according to the signal generator 30, it is possible to acquire a similar effect even if the test apparatus 10 does not include the digital filter 34 with a hardware configuration at a subsequent stage of the waveform generating section 32.

While the present invention has been described with the embodiment, the technical scope of the invention is not limited to the above-described embodiment. It is apparent to persons skilled in the art that various alternations and improvements can be added to the above-described embodiment. It is apparent from the scope of the claims that the embodiment added such alternations or improvements can be included in the technical scope of the present invention.

According to the present invention as thus described above, the test apparatus and the test method for outputting a test signal indicative of the receiving waveform inputted to the receiving circuit through the communication cable using a DA converter with a low resolution.

What is claimed is:

1. A test apparatus for testing a device under test including a receiving circuit for receiving signals transmitted through a communication cable, comprising:
    a waveform generating section for outputting waveform data, which includes a frequency component attenuated according to an attenuation characteristic of the communication cable, to define a waveform to be provided to an input terminal of the receiving circuit;
    a digital filter having a filter characteristic substantially reverse to the attenuation characteristic of the communication cable, for outputting amplified waveform data having a substantially flat frequency characteristic, in which a least number of bits required for indicating the waveform is smaller than a number of bits of the waveform data output from the waveform generating section, obtained by boosting the attenuated frequency component of the waveform data;
    a DA converter for converting the amplified waveform data to an analog waveform; and
    a low-pass filter having an attenuation characteristic substantially same as that of the communication cable, for attenuating the analog waveform and providing the same to the receiving circuit.

2. The test apparatus according to claim 1, wherein a minimum voltage step of converting by the DA converter is larger than a maximum voltage of the analog waveform provided from the low-pass filter to the receiving circuit.

3. The test apparatus according to claim 1, wherein
    the communication cable includes a plurality of transmitting paths,
    the receiving circuit includes the plurality of input terminals for respectively receiving a signal from each of the plurality of transmitting paths, and
    the waveform generating section outputs the plurality of waveform data which should be provided to the plurality of input terminals and which include interference between the plurality of transmitting paths.

4. The test apparatus according to claim 1, further comprising a simulation section for calculating by simulation a receiving waveform inputted to the input terminal of the receiving circuit after an output signal of a transmitting circuit for transmitting a signal to the receiving circuit through the communication cable has passed through the communication cable, wherein
    the waveform generating section acquires digital data of the receiving waveform from the simulating section and outputs the same as the waveform data.

5. A test method for testing a device under test including a receiving circuit for receiving signals transmitted through a communication cable, comprising:
    outputting waveform data, which includes a frequency component attenuated according to an attenuation characteristic of the communication cable, to define a waveform to be provided to an input terminal of the receiving circuit;
    outputting amplified waveform data having a substantially flat frequency characteristic, in which a least number of bits required for indicating the waveform is smaller than a number of bits of the waveform data output in the outputting waveform data step, obtained by boosting the attenuated frequency component of the waveform data, the outputting having a filter characteristic substantially reverse to the attenuation characteristic of the communication cable;

converting the amplified waveform data to an analog waveform; and attenuating the analog waveform and providing the same to the receiving circuit, the attenuating having an attenuation characteristic substantially same as that of the communication cable.

6. The test method according to claim 5, further comprising calculating by simulation a receiving waveform inputted to the input terminal of the receiving circuit after an output signal of a transmitting circuit for transmitting a signal to the receiving circuit through the communication cable has passed through the communication cable, wherein the outputting waveform data includes acquiring digital data of the receiving waveform from the simulating section to output the same as the waveform data.

7. A test apparatus comprising:

a waveform generating section for outputting waveform data, which includes an attenuated frequency component, to define a waveform to be provided to an input terminal of a device under test;

a digital filter being connected to an output terminal of the waveform generating section, for outputting amplified waveform data having a substantially flat frequency characteristic, in which a least number of bits required for indicating the waveform is smaller than a number of bits of the waveform data output from the waveform generating section, obtained by boosting the attenuated frequency component of the waveform data based on a predetermined filter characteristic;

a DA converter being connected to an output terminal of the digital filter, for converting the amplified waveform data to an analog waveform; and an analog filter being connected to an output terminal of the DA converter and having a filter characteristic substantially reverse to that of the digital filter, for attenuating the analog waveform to supply it to the input terminal of the device under test.

8. The test apparatus according to claim 7, wherein a minimum voltage step of converting by the DA converter is larger than a maximum voltage of the analog waveform provided from the analog filter to the device under test.

9. The test apparatus according to claim 7, wherein the filter characteristic of the digital filter is a transfer characteristic substantially reverse to that of an interchange circuit element that transfers an output signal of a transmitting circuit for transmitting a signal to the device under test.

10. The test apparatus according to claim 7, further comprising a simulation section for calculating by simulation a receiving waveform inputted to the input terminal of the device under test after an output signal of a transmitting circuit for transmitting a signal to the device under test through the communication cable has passed through the interchange circuit element, wherein the waveform generating section acquires digital data from the input terminal of the device under test from the simulating section and outputs the same as the waveform data.

11. A test method comprising:

outputting waveform data, which includes an attenuated frequency component, to define a waveform to be provided to an input terminal of a device under test;

outputting amplified waveform data having a substantially flat frequency characteristic, in which a least number of bits required for indicating the waveform is smaller than a number of bits of the waveform data output in the outputting waveform data step, obtained by boosting the attenuated frequency component of the waveform data based on a predetermined filter characteristic;

converting the amplified waveform data to an analog waveform; and attenuating the analog waveform and providing the same to the input terminal of the device under test, the attenuating having a filter characteristic substantially reverse to that of the outputting amplified waveform data.

12. A waveform generator comprising:

a waveform generating section for outputting waveform data, which includes an attenuated frequency component, to define a waveform to be output;

a digital filter being connected to an output terminal of the waveform generating section, for outputting amplified waveform data having a substantially flat frequency characteristic, in which a least number of bits required for indicating the waveform is smaller than a number of bits of the waveform data output from the waveform generating section, obtained by boosting the attenuated frequency component of the waveform data based on a predetermined filter characteristic;

a DA converter being connected to an output terminal of the digital filter, for converting the amplified waveform data to an analog waveform; and an analog filter being connected to an output terminal of the DA converter and having a filter characteristic substantially reverse to that of the digital filter, for attenuating the analog waveform to output it.

13. A waveform generating method comprising:

outputting waveform data, which includes an attenuated frequency component, to define a waveform to be output;

outputting amplified waveform data having a substantially flat frequency characteristic, in which a least number of bits required for indicating the waveform is smaller than a number of bits of the waveform data output in the outputting waveform data step, obtained by boosting the attenuated frequency component of the waveform data based on a predetermined filter characteristic;

converting the amplified waveform data to an analog waveform; and attenuating the analog waveform and outputting it, the attenuating having a filter characteristic substantially reverse to that of the outputting amplified waveform data.

* * * * *